(No Model.)

C. E. VREELAND.
BUTTON FASTENER.

No. 382,342. Patented May 8, 1888.

WITNESSES.
Wm. P. Patton.
R. S. Ferguson.

INVENTOR.
Cyrus E. Vreeland.
By Attorney H. A. Seymour.

UNITED STATES PATENT OFFICE.

CYRUS E. VREELAND, OF ORANGE, ASSIGNOR TO EGBERT ALSDORF AND GEORGE D. PAUL, BOTH OF NEWARK, NEW JERSEY.

BUTTON-FASTENER.

SPECIFICATION forming part of Letters Patent No. 382,342, dated May 8, 1888.

Application filed January 14, 1888. Serial No. 260,790. (No model.)

*To all whom it may concern:*

Be it known that I, CYRUS E. VREELAND, of Orange, in the county of Essex and State of New Jersey, have invented certain new and useful Improvements in Button-Fasteners; and I do hereby declare the following to be a full, clear, and exact description of the invention, such as will enable others skilled in the art to which it appertains to make and use the same.

My invention relates to an improvement in button-fasteners.

The object of my present improvement is to produce a light, neat, and simple device for the purpose which may be readily applied to the shanks of buttons that are to be permanently or removably attached to garments, and which will securely fasten the buttons in place or permit their quick removal from a garment when it is desired.

With these objects in view my invention consists in certain features of construction and combinations of parts, that will be hereinafter described, and pointed out in the claims.

Figure 1:
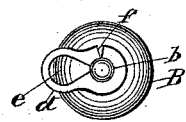
Figure 2:
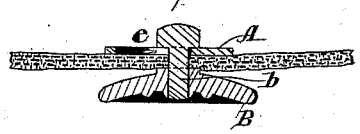
Figure 3:
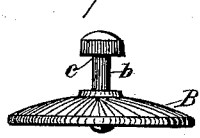
Figure 4:
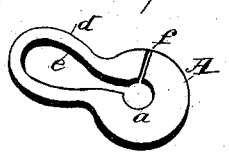

Referring to the drawings, Figure 1 is a perspective view of the button-fastener in secured position on the shank of a button. Fig. 2 is a sectional view of the button-fastener locked to the shank of a button and attached to fibrous material. Fig. 3 represents a button provided with a grooved shank which is adapted to receive my improved fastener. Fig. 4 represents the fastener separate.

This button-fastener consists of a disk, A, cut, stamped, or pressed from any suitable sheet of metal. This disk or washer is of a proper diameter to insure a proper bearing upon the surface of the material to which the button is secured. There is a central perforation, $a$, made in the disk, which is of such a relative diameter to the reduced shank $b$ of the button B in the bottom of the groove $c$, formed near the free end of this button-shank, as to neatly fit the same when the parts are connected.

Made integral with the disk A is a laterally-extending wing, $d$, which is preferably rounded at its outer end, as shown. Through the disk A and wing $d$ a longitudinal oval slot is formed, which is cut, stamped, or punched to produce an orifice, $e$, that communicates with the perforation $a$ of the disk, said oval or pear-shaped orifice having its larger portion located at the outer end of the wing $d$.

The disk A is provided, preferably at or near the point where the wing $d$ connects to it, with a slot, $f$, that intersects the perforation $a$, and thus gives more elasticity to the wing $d$ and enables the device to be readily applied to and removed from the shank of the button, and at the same time be securely held in place on said shank. It will be seen that this form of construction and perforation of the disk A and wing $d$ will convert the wing $d$ into an elastic bow-spring, which is integral with the disk A, and that the gradually-converging slot will guide the shank B into the central orifice, $a$, if the grooved portion of the shank is inserted into the enlarged orifice of the ovate slot $e$ and forced to enter the central perforation, $a$, which latter will firmly but elastically embrace the grooved portion of the button-shank and act as a retaining-washer to hold the button in place on the garment to which the button and this fastener have been applied.

The advantages of this fastening device consist in its neat form, which is devoid of sharp angles to catch onto or wear out clothing in contact with it; also, the facility with which it may be attached to the shank of the button or removed from it, and its security as a fastener.

It is important that the fastener should be made out of sheet metal, so that a flat disk is afforded with a good bearing-surface on the cloth to which it is applied, as if made of wire it will collapse and pull through goods that is of loose texture.

Having thus described my invention, what I claim as new, and desire to secure by Letters Patent, is—

1. The button-fastener herein described, having a flat disk perforated centrally and provided with an elastic spring-bow wing having an ovate slot that intersects with its converging end the central orifice of the disk, substantially as set forth.

2. In the button-fastener herein described, the combination, with a centrally-perforated disk, of an ovate bow-spring provided with an ovate perforation leading into the central perforation of the disk and adapted to have a spring engagement with a grooved button-shank, substantially as set forth.

3. In a button-fastener, the combination, with a centrally-perforated disk, of an integral bow-spring provided with an ovate perforation opening into the central perforation of the disk, and a slot communicating with said central perforation, substantially as set forth.

In testimony whereof I have signed this specification in the presence of two subscribing witnesses.

CYRUS E. VREELAND.

Witnesses:
JOSEPH H. MOORE,
GEORGE D. PAUL.